United States Patent Office.

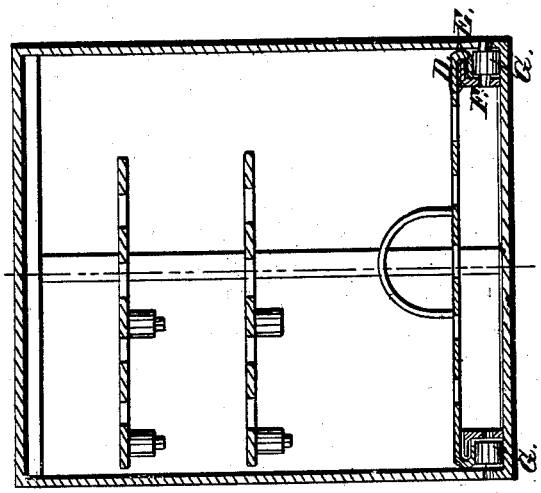
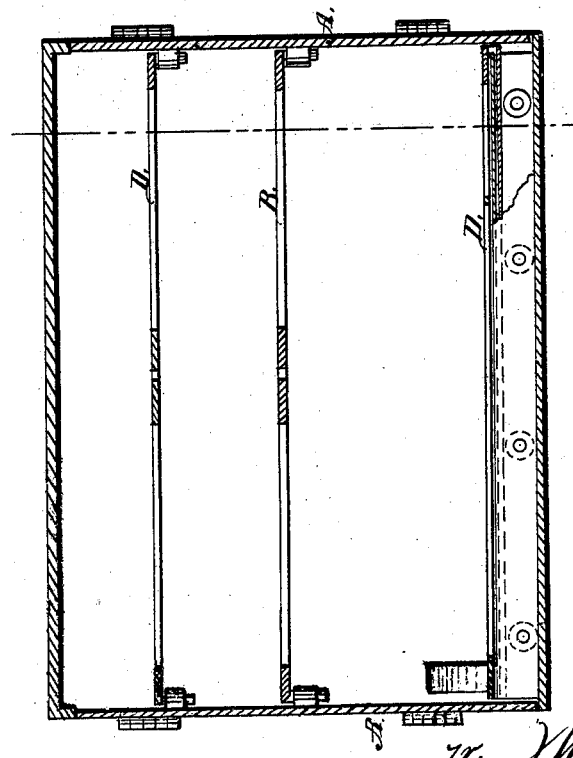

CLARISSA PRESTON, OF WHEELING, WEST VIRGINIA.

Letters Patent No. 94,643, dated September 7, 1869.

OVEN.

The Schedule referred to in these Letters Patent and making part of the same

*To all whom it may concern:*

Be it known that I, CLARISSA PRESTON, of Wheeling, in the county of Ohio, and State of West Virginia, have invented a new and useful Improvement in Ovens; and I do hereby declare that the following is a full, clear, and exact description thereof, which will enable others skilled in the art to make and use the same, reference being had to the accompanying drawings, forming part of this specification.

This invention relates to improvements in ovens for baking bread and other edible articles, whereby it is designed to provide a more convenient and useful arrangement of grates for supporting the articles while being baked, and to facilitate the placing on and removing therefrom of the said articles.

The invention consists in an arrangement of sliding grate, whereby it is prevented from falling from its supports when drawn out for the reception of the articles to be baked.

Figure 1 represents a longitudinal sectional elevation of an oven provided with my improvements.

Figure 2 represents a transverse sectional elevation of the same.

Similar letters of reference indicate corresponding parts.

A represents the doors of an oven, which may be of any kind, whether such as are provided in cooking-stoves, ranges, or those employed in bakeries.

B represents the grates which I propose to support upon the inner sides of the said doors by any suitable detachable arrangement, whereby they may be readily removed if desired.

When the oven is of such form as opens out on both sides of the stove, I prefer to make the grates in two parts, as represented in fig. 1, and connect one part at each side. Any preferred number of these grates may be employed, one above another, as may be considered best, and they may be placed close together when thin articles, such as pies and cakes, are to be baked on plates, and when articles requiring more space are to be cooked, some of them may be removed.

D represents my improved arrangement of sliding grates, which may be bent over at the edges, as represented at E, and hook over the flanges F of the slides; and rollers G are introduced behind the slides, to cause the slides to work freely.

Having thus described my invention,

I claim as new, and desire to secure by Letters Patent—

The grate D, having its side edges bent to hook over the flanges F, and furnish bearings for the same to move on the rollers G, all arranged substantially as herein shown and described.

CLARISSA PRESTON.

Witnesses:
MARY PRESTON,
HARRIET MEGAW.